United States Patent [19]

Bendell

[11] 4,331,979
[45] May 25, 1982

[54] LINE-SCAN STILL IMAGE REPRODUCER

[75] Inventor: Sidney L. Bendell, Riverton, N.J.

[73] Assignee: RCA Corporation, New York, N.Y.

[21] Appl. No.: 193,024

[22] Filed: Oct. 2, 1980

[51] Int. Cl.³ .............................................. H04N 3/02
[52] U.S. Cl. .................................... 358/209; 358/55;
358/214; 358/225
[58] Field of Search ....................... 358/41, 42, 44, 48,
358/50, 54, 55, 53, 209, 213, 214, 225, 229, 75,
76

[56] References Cited

U.S. PATENT DOCUMENTS

| | | | |
|---|---|---|---|
| 3,371,160 | 2/1968 | Hurford . | |
| 3,739,095 | 6/1973 | Alden | 358/285 |
| 3,949,161 | 4/1976 | Fujishima | 358/54 |
| 3,993,865 | 11/1976 | Browne | 358/285 |
| 4,205,337 | 5/1980 | Millward | 358/54 |
| 4,245,240 | 1/1981 | Tanaka | 358/43 |
| 4,263,613 | 4/1981 | Tokuhara | 358/55 |
| 4,268,119 | 5/1981 | Hartmann | 358/55 |

FOREIGN PATENT DOCUMENTS 2025731  1/1980  United Kingdom ................. 358/54

OTHER PUBLICATIONS

Facsimile Scanner, Casada et al., IBM Tech. Disc. Bulletin, vol. 15, #4, Sep. 1972, pp. 1401-1402.
"A Continuous Motion Color Film Telecine Using CCD Line Sensors", Poetsch, SMPTE Journal, vol. 87, #12, pp. 815-820.

Primary Examiner—Michael A. Masinick
Attorney, Agent, or Firm—Eugene M. Whitacre; Paul J. Rasmussen; William H. Meise

[57] ABSTRACT

A still image produced by a slide is converted into a television signal by a solid-state imager driven across the image.

1 Claim, 8 Drawing Figures

LINE-SCAN STILL IMAGE REPRODUCER

BACKGROUND OF THE INVENTION

This invention relates to an arrangement for using a line-scan television imager to produce television signals representative of a still image scene such as a scene produced by projecting a slide onto the surface of the imager.

It is often desirable to televise a still image. This may occur, for example, where a test image or test pattern is to be viewed for television receiver adjustments. More often, a television broadcaster may wish to broadcast television signals representative of one frame of a motion-picture film or a camera slide. It is known to use flying-spot scanners to generate a point light source which scans a rectangular raster. The scanning light source is projected through the slide onto a photosensitive detector to produce a time-varying signal in television format. The flying-spot scanner may be mechanically clumsy, because it uses a cathode ray tube to produce the moving point light source.

More recently, solid-state imagers such as charge-coupled devices (CCD) have been used in television cameras. A television signal representative of a still image can be generated with a two-dimensional CCD camera by projecting the image onto the photosensitive surface of the CCD imager, and reading out the television picture thus generated. While such two-dimensional CCD cameras are expected to become commercially practical in the future, the present state of the art makes it difficult to produce two-dimensional CCD imager arrays substantially without defects.

The manufacture of usable CCD arrays is made easier when the number of elements of the array is reduced. Consequently, in those applications in which it is possible, line-scan CCD arrays are used. A line-scan CCD array comprises a single line of photosensitive elements, and is thus a "one-dimensional" array. Being one-dimensional, such a linear array can generate a television signal representative of a two-dimensional scene only by relative motion between the image and the sensor. In the case of motion-picture film, the film may be kept in continuous motion whereby a moving image is generated at the surface of the line-scan sensor. Also, mirrors may be used to create a moving image as described in U.S. Pat. No. 4,205,337 issued May 27, 1980 to Millward. Such mirrors tend to be mechanically delicate and unsuited for hard use such as is encountered in broadcast studios. An improved arrangement for generating a television signal from a still image by the use of a line-scan sensor is desired.

SUMMARY OF THE INVENTION

An arrangement for representing a still image in the form of television signals includes a line-scan imager for generating television signals. A movable mount is affixed to the line-scan imager for allowing translation of the imager across the image under the control of a drive signal. A drive signal generator is coupled to the movable mount for generating the drive signal for translating the imager across the image. A control signal generator is coupled to the movable mount for generating control signals in response to the translation. Reading circuits are coupled to the imager and to the control signal generator for reading television signals from the imager in response to the control signals.

DESCRIPTION OF THE INVENTION

Figure 1C:
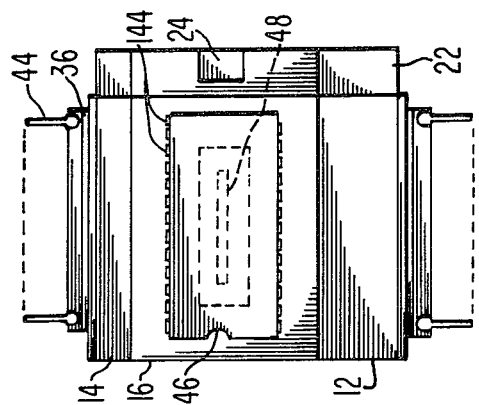
FIGS. 1a-1c illustrates an optical assembly for color television including line-scan CCD imagers.
Figure 1B:
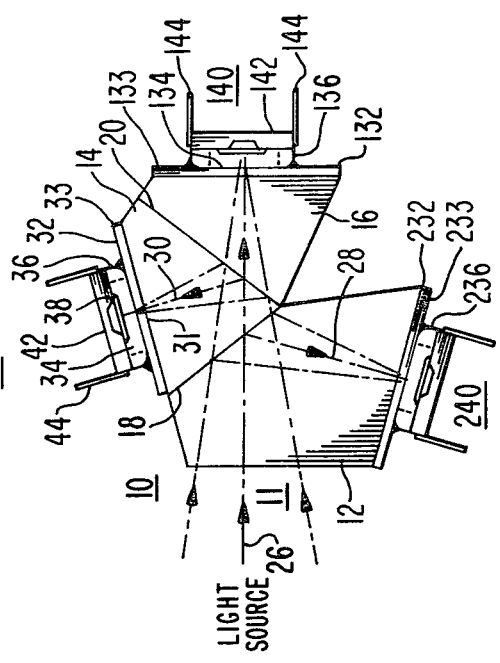
Figure 1A:
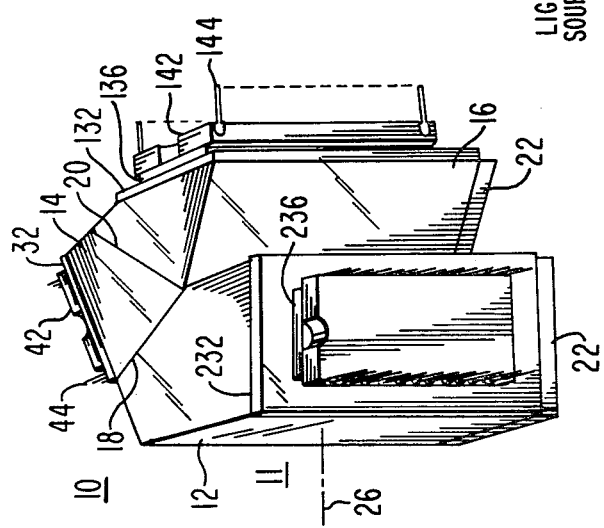

The arrangement of FIG. 1 is described in copending application Ser. No. 180,897, filed Aug. 25, 1980 in the name of S. L. Bendell. In FIG. 1, a light-splitting prism designated generally as 10 is formed from three optical glass portions 12, 14 and 16 separated by dichroic surfaces illustrated in FIG. 1b as lines 18 and 20. A base 22 affixed to the prism provides a mounting surface for the assembly and includes an indexing notch 24 by which the assembly may be placed exactly in position on a mount, not shown in FIG. 1. Light from a source (not shown) enters the prism along an optical axis 26 at an input port designated generally as 11 lying along the left edge (as illustrated in FIG. 1b) of portion 12 of the prism. This light represents a scene to be televised and may include red, green and blue components. The blue component of the light passing through portion 12 of the prism is reflected along axis 28 by dichroic surface 18, while the remaining yellow portion of the light from the scene passes into portion 14 of the prism. The red component of the light passing through portion 14 of the prism is reflected along axis 30 by dichroic surface 20. The remaining green component of the incident light from the scene continues along axis 26 through dichroic surface 20 into portion 16 of prism 10.

The separated red light reflected along axis 30 by dichroic surface 20 passes through portion 14 of the prism and exits from an exit port 31 of the prism, and through a trimming filter 32. The light continues along axis 30 until it exits from trimming filter 32 at surface 33. The light continuing from surface 33 along axis 30 enters an air space 34 within a hollow spacer 36, and finally enters a window 38 of an imaging device designated generally as 40. Imaging device 40 is a line-scan CCD. Imager CCD 40 includes a rigid integrated-circuit (IC) body 42 and electrical connection pins 44. Similarly, the green light passing through dichroic surface 20 and through portion 16 of prism 10 along axis 26 enters in succession a green trim filter 132, a passage or space 134 within a spacer 136 and finally the window of a CCD imager designated generally as 140 housed within a rigid nonconductive body 142 having electrical connection pins 144. The blue light reflected from dichroic surface 18 similarly passes through a blue trim filter 232 and a spacer 236 to enter imager 240.

The effective optical path lengths from entrance port 11 to the red, green and blue exit ports of light-splitting prism 10 are designed to be precisely the same by proper design of the size of the prism and of the trim filters. However, the position of the active portion of the imager within the body of the integrated circuit housing is not well controlled during manufacture. Spacers 36, 136 and 236 have a thickness selected in conjunction with the physical characteristics of the imager IC with which they are to be used. Thus, the effective optical path length from light entrance port 11 of the prism to an imager is the same for each color of light in each of the three described paths. This control of the optical distance between the light input port and each of the imagers makes it possible to properly register the images entering the input port from an objective lens (not shown) and thereby achieve optimum resolution.

In the view of FIG. 1c, the structure of the body 40 of the red imager is more easily recognized than in FIG. 1b. In FIG. 1c, the array of electrical contact pins 144 is apparent. The solid-state imager is addressed, powered and the signals are coupled to appropriate circuits by way of pins 144 which are adapted to be coupled to a standard multipin IC socket.

Figure 2:
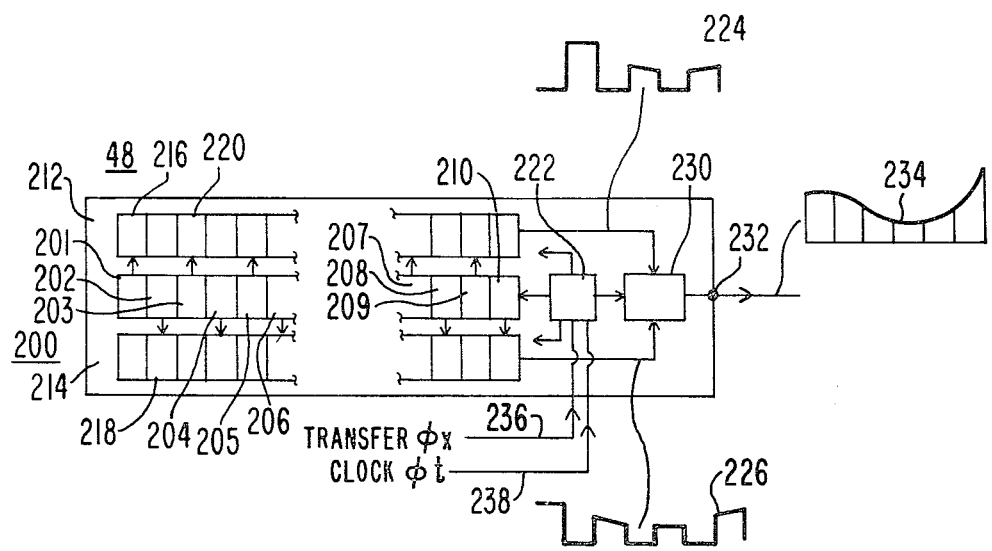
FIG. 2 illustrates in block form certain aspects of an imager in FIG. 1.

FIG. 2 represents a line-scan imager such as 48. Imager 48 includes an array 201-210 of photosensitive areas which generate electrical signals in response to the time integral of light falling upon the element surfaces. While array 200 of photosensitive elements 201-210 as illustrated in FIG. 2 contains only a few elements, the actual number of elements used in practice depends upon the desired resolution. An actual embodiment of a line-scan CCD array for the invention included 1024 photosensitive elements. Adjacent to line-scan photosensitive element array 200 are arrays 212 and 214 of signal-receiving buffer stages. Upon application of the proper signal, the signals appearing in the elements 201-210 of photosensitive element array 200 are transferred to corresponding elements of buffer arrays 212 and 214. Upon receipt of a control transfer signal $\phi x$ over a conductor 236, the video signal in photosensitive element array 201 is transferred to an element 216 of buffer 212, the signal in element 202 is transferred to an element 218 of buffer element 214, and the signal in photosensitive element 203 is transferred to buffer element 220, and so forth. The signal transfer upon application of an appropriate control signal is similarly alternately coupled to the buffers along the entire length of the array. Thus, buffer 212 receives along alternate buffer cells the signal from every other photosensitive element, while corresponding elements of buffer 214 remain empty. Similarly, buffer 214 receives in alternate buffer cells the remaining signal in every other photosensitive element. This lateral transfer of the signal from the photosensitive elements allows light integration to begin again in photosensitive elements during that interval in which the signal is being read out of the buffer array, and the greater integration time results in greater sensitivity. The transport clock signals $\phi t$ applied to logic curcuit 222 by way of conductor 238 are divided in a circuit illustrated as a block 222 into two phases, and each half of the clock is applied to a buffer array 212, 214 to read out the signal. An example of a video signal readout from buffer array 212 is illustrated as 224, and a corresponding readout from buffer 214 is illustrated as waveform 226. The readouts from buffer arrays 212 and 214 are applied to a multiplexer 230 and combined to produce a sum output signal at an output terminal 232. The sum output signal resulting from signals 224 and 226 is illustrated as 234.

Figure 3:
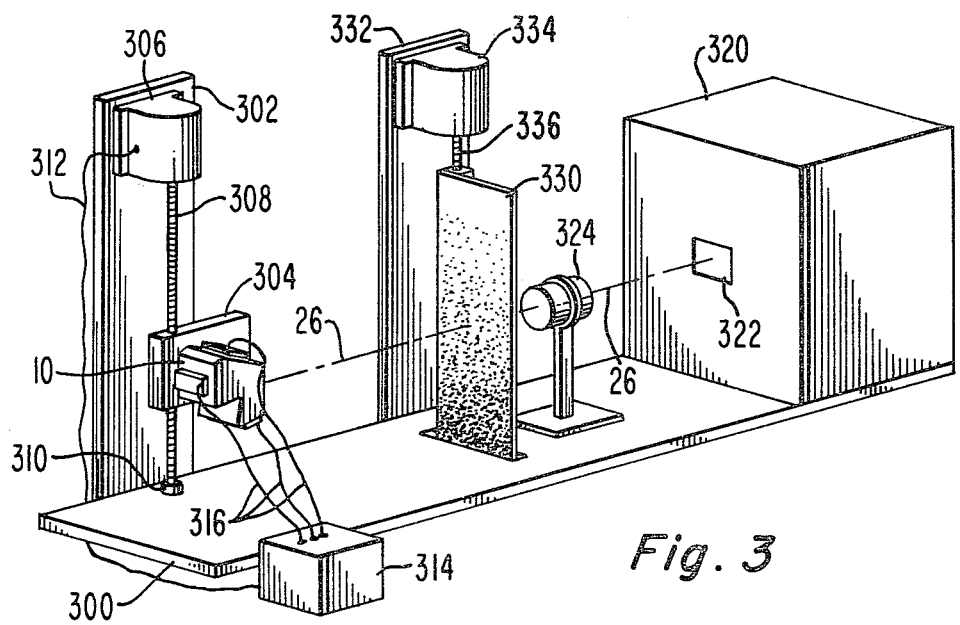
FIG. 3 illustrates an assembly of FIG. 1 used in accordance with the invention for generating television signals of a still image.

The light splitting arrangement of FIG. 1 in the form of a prism rigidly bonded to a plurality of registered imaging transducers or CCDs forms a rigid lightweight assembly. The bonding and low mass of the assembly prevents relative motion between the imagers and prism which might cause misregistration. Consequently, it is possible to move the entire assembly. FIG. 3 illustrates in simplified form an arrangement according to the invention in which a base 300 supports a vertical track 302 upon which a slider 304 is mounted for vertical movement. A CCD/prism arrangement such as 10 of FIG. 1 is mounted on slider 304 and is supported thereby. A drive motor 306 is coupled to a threaded screw 308 which engages a corresponding screw thread in slider 304. Screw 308 has an unthreaded portion where it passes through a bushing 310 in base 300. Motor 306 is reversible and is controlled by a drive signal applied through a cable 312. Each CCD imager of CCD/prism arrangement 10 is coupled by way of cable 316 to suitable circuits located in a box 314. One such circuit is illustrated in FIG. 5.

Also mounted on base 300 is a film, or slide handler and light source illustrated as a box 320. Such a slide handler may be of conventional construction and include a conventional light source. Light projected through the slide emanates from a port 322 along an axis 26. Additional lenses such as 324 may be located between port 322 and the light input port of assembly 10. A neutral density (ND) filter in the form of a rectangular sheet 330 is slidably mounted on a support 332 and is adapted for vertical translation by means of a motor 334 and screw 336. As illustrated, filter 330 is substantially clear at one end and opaque at the other end. The form taken by the neutral density filter is not particularly important, and a rotary type such as is commonly used in television cameras may also be used.

Figure 4:
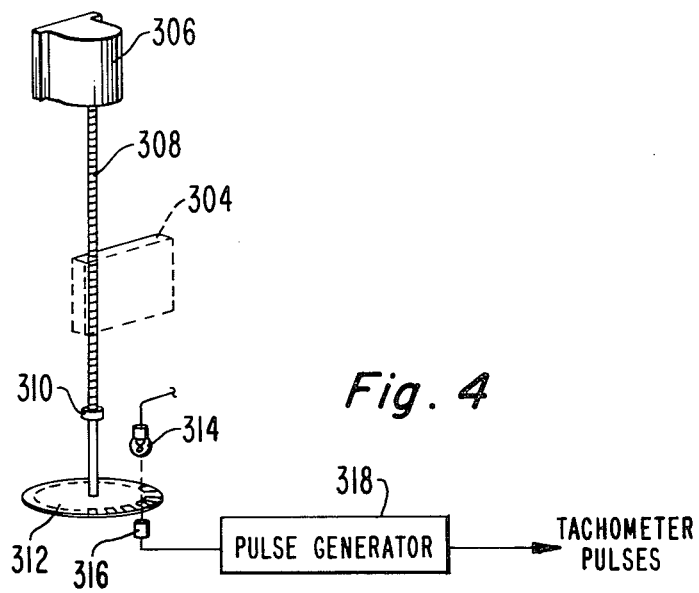
FIG. 4 illustrates partially in pictorial and partially in block form a drive motor and tachometer of the arrangement of FIG. 3.

FIG. 4 illustrates details of a tachometer associated with the arrangement of FIG. 3. In FIG. 4, motor 306, threaded screw 308 and bushing 310 are illustrated separately. Slider 304 is shown in phantom view. The pitch of threaded screw 308 is selected to translate imager assembly 10 across the image with a predetermined number of turns. For example, the pitch of screw 308 may be selected so that five turns of screw 308 translate line scan sensor assembly 10 across the image. In order to produce 525 pulses so as to provide standard television vertical resolution a toothed wheel 312 coupled to screw 308 contains 105 serrations. A light source 314 is coupled to a light sensor 316 by way of the serrations of toothed wheel 312 so that the five turns of screw 308 required to translate the image sensor across the image results in 5 times 105 light pulses for a total of 525 light pulses. A pulse generator 318 coupled to light sensor 316 processes the resulting pulses to square the edges and the like and produces at its output tachometer pulses related to the position of the image sensor relative to the image.

Figure 5:
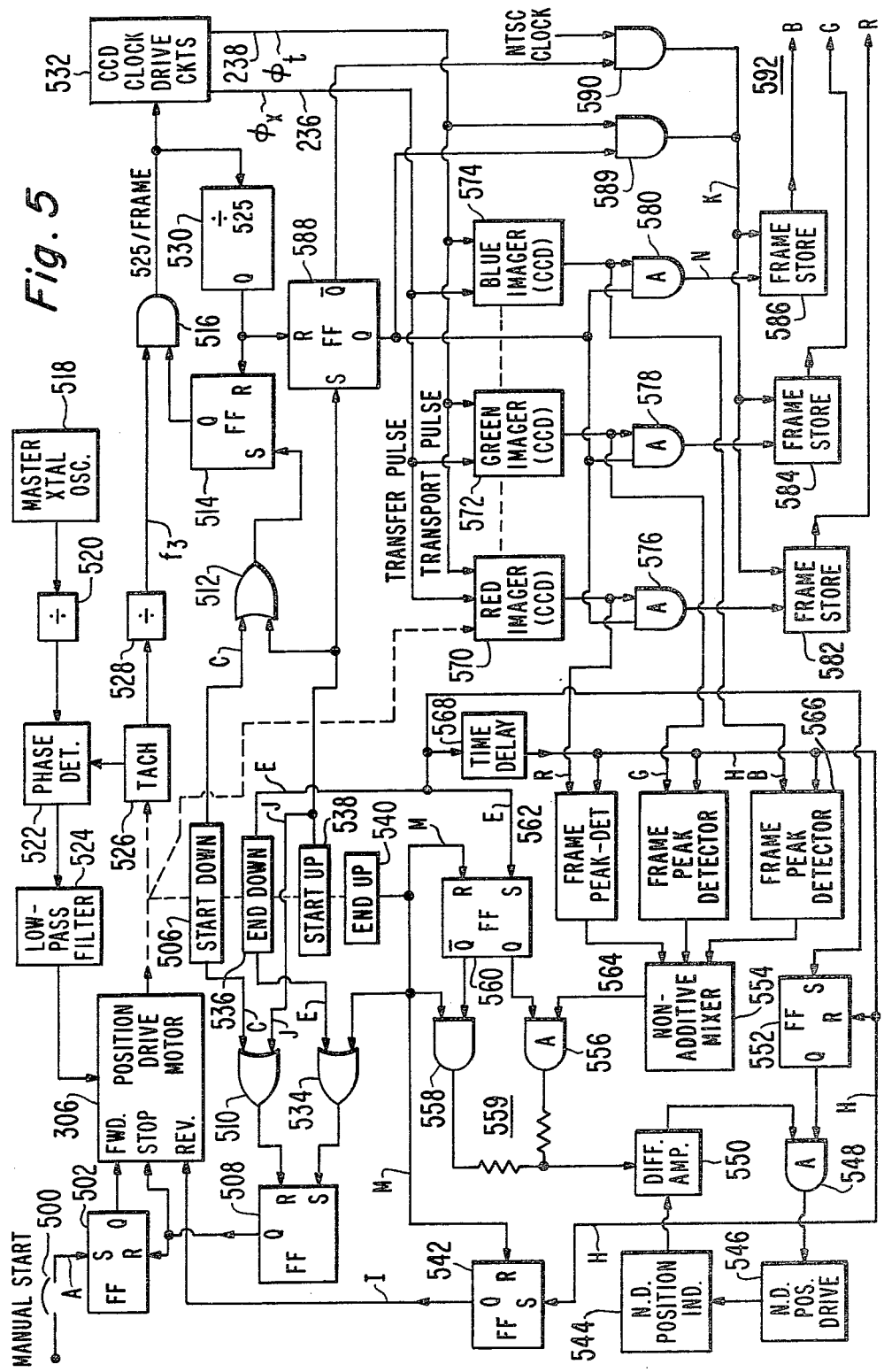
FIG. 5 is a block diagram of electrical circuits for use with the arrangement of FIG. 3.

FIG. 5 illustrates in block diagram form circuits suitable for driving the imager and processing the signal. When a slide is placed in slide handler 320, it may be light or dark. That is to say, the amount of light passing through highlight areas of the slide is not known beforehand. If the neutral density filter were not set, the brightest areas of the slide might overload the image sensor so as to produce distortion, or if no distortion is produced nevertheless the dynamic range of the resulting signal might be limited. Consequently, according to one aspect of the invention, a normalizing cycle in which the neutral density filter is set precedes the cycle in which the final television signal is produced.

Figure 6:
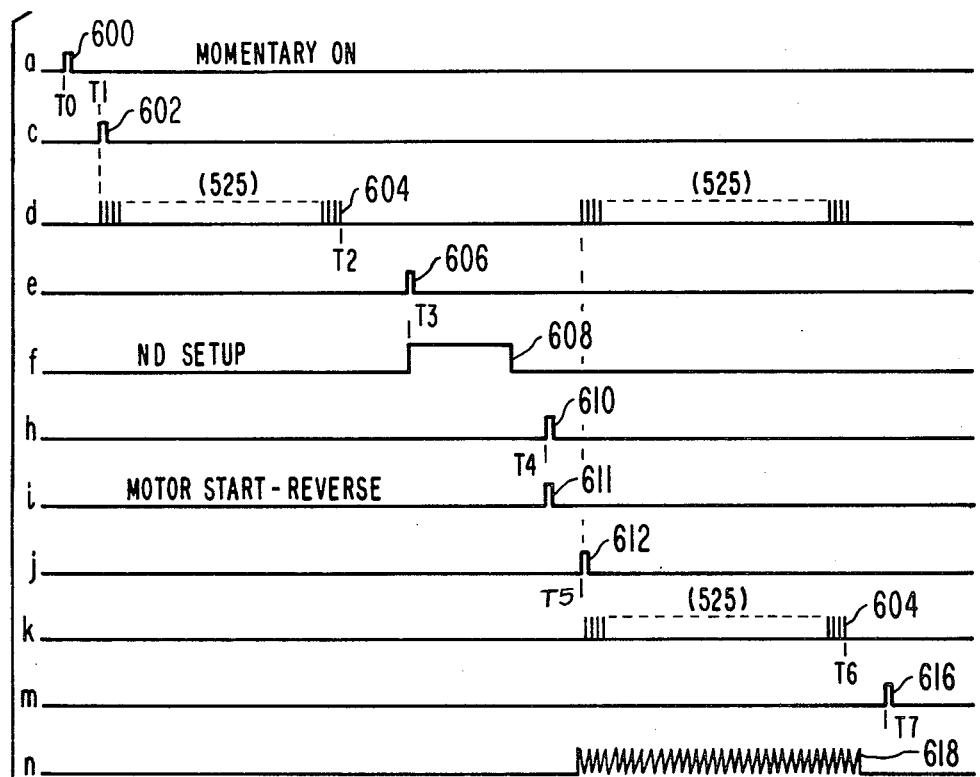
FIG. 6 illustrates waveforms occurring during operation in the arrangement of FIG. 5.

Before the beginning of a cycle of operation, binary or flip-flop (FF) 502 at upper left of FIG. 5 and all the other FF are in the reset (R) state. At a time T1 as illustrated in FIG. 6, a manual-start momentary-contact switch 500 is pushed by an operator to initiate a pulse illustrated as pulse 600 of FIG. 6a on a conductor A coupled to the set (S) input of FF 502. It should be noted that the signals illustrated in FIG. 6a–n appear on conductors of FIG. 5 carrying the same letter designation, but the red, green and blue-representative video signals appearing on conductors R, G and B, respectively of FIG. 5 are not shown in FIG. 6 since these signals are dependent upon the video content, are well-known and are not useful in explaining the system cycle operation. At time T0, FF 502 is set and its Q output goes high. The Q output transition is applied to the forward (FWD) input of a position drive motor 306 to start the motor running. Motor 306 is mechanically coupled to a tachometer 526, to position sensors 506, 536, 538 and 540 and to red, green and blue imagers 570–574, as described previously and as illustrated by dotted connecting lines representing mechanical connections.

As mentioned in conjunction with FIG. 2, the individual image sensors produce signal as a result of integration as a function of time of the light falling upon their photosensitive surface. Consequently, if the rate of readout is irregular, the integration times will vary irregularly and as a result the video signal produced at any particular position of the image sensor along the image will vary. This will result in a pattern of vertical brightness variations in the displayed image. Such brightness variations are not acceptable. In order to cause the readout of the image sensors to occur at a regular rate, the vertical translation rate of the image sensor is controlled. The control is accomplished by a phase-lock loop (PLL) coupled to the position drive or motor. As motor 306 runs in response to setting of FF 502 it drives the imager assembly downward from an extreme upper position, and tachometer 526 produces pulses which are coupled to an input of a phase detector 522 for comparison with pulses divided by a counter 520 from a master oscillator 518. Phase detector 522 produces a pulsatory output signal which is applied to the input of a low-pass filter 524 for producing a direct control voltage which is applied to a control input of motor 306 in a degenerative manner so as to form a phase-lock loop by which the tachometer pulses are maintained in synchronism with the divided oscillator pulses so as to maintain a constant motor drive speed.

A finite time is required for the motor to come up to full speed and for the PLL to stabilize. A start-down position sensor 506 which may be a simple microswitch or light-source/photosensor combination is mechanically coupled to the structure so as to be triggered at a time T1 after the system has stabilized at full running speed. Sensor 506 produces on conductors C a pulse illustrated as 602 in FIG. 6c to start the first reading of the imagers. Pulse 602 is coupled by an OR gate (OR) 510 to the R input of Ff 508, thereby guaranteeing that FF 508 is in the reset stage. Pulse 602 is also applied by way of OR 512 to the S input of FF 514. The Q output of FF 514 goes high, enabling AND 516. AND 516 allows pulses derived from tachometer 526 by way of a divider 528 to be coupled to CCD imager clock drive circuits 532 for controlling the generation in synchronism with the motor drive of clock pulses (not shown) and of transfer pulses $\phi x$ illustrated as 604 in FIG. 6d. A divider 530 coupled to the output of AND 516 begins to count pulses produced by AND 516, and counts towards 525, corresponding to the number of horizontal lines in a frame. The full count of counter 530 may be other than 525. Where it is desired to store only sufficient video to fit into the interstice between successive television horizontal blanking intervals, the count may be 488, and for a PAL system may be 588.

During the interval T1–T2, clock ($\phi t$) and transfer ($\phi x$) pulses generated by clock drive circuit 532 on conductors 238 and 236, respectively, are coupled to and cause imagers 570–574 to produce sequential lines of video-representative signals. The video signals are applied to analog inputs of corresponding analog gates 576–580, but do not pass through the gates to frame stores 582–586 because the enable inputs of gates 576–580 are coupled to the Q output of FF 588, which has not been set. Consequently, the image information is not stored during the first pass of the imager assembly across the image. The signals from imagers 570–574 are also coupled to corresponding inputs of red, green and blue-channel frame peak detectors 562–566. These peak detectors respond to the video to produce and hold a voltage representative of the peak value attained by the signal from the corresponding imager. The peak-representative signals from peak detectors 562–566 are applied to the inputs of a non-additive mixer 554 which may be as described in U.S. Pat. No. 3,371,160 issued Feb. 27, 1968 to Hurford. The output of non-additive mixer 554 is applied to the analog input of an analog gate 556, but the signal goes no further at this time because the enable input of AND 556 is coupled to the Q output of FF 560, which is low because FF 560 is in the reset state.

Divider 530 produces at its Q output a pulse when a full count of 525 is achieved. This pulse occurs at a time T2 as illustrated in FIG. 6, and resets FF 514 to disable AND 516 and prevent application of further pulses 604 to the clock drive circuits 532. This prevents further generation of image-representative signals by imagers 570–574. The pulse produced at the Q output of divider 530 at time T2 is also applied to the R input of FF 588 to guarantee that it is in the reset condition.

The motor continues to drive the image assembly downward after time T2 until a later time T3 at which a sensor 536 senses the extreme downward travel of the imager assembly and produces on conductors E a pulse illustrated as 606 in FIG. 6e. Pulse 606 is applied by way of OR 534 to the S input of FF 508 to reset FF 502 and thereby stop motor 306. Pulse 606 is also applied to the input of a time delay circuit 568 and to the S inputs of FF 552 and 560. The Q output of FF 552 goes high when FF 552 is set by pulse 606, thereby enabling analog gate 548 and coupling the output of differential amplifier 550 to the neutral-density position drive assembly 546. The Q output of FF 560 also goes high, so that the output of non-additive mixer 554 is coupled by way of resistor network 559 to an input of differential amplifier 550. This closes at time T3 a feedback loop by which neutral-density (ND) position drive assembly 546 drives the neutral-density filter and its associated position indicator 544 in such a manner as to set the filter to a position suitable for providing proper dynamic range with the slide being processed.

Time delay circuit 568 includes a time delay greater than the maximum time required for the ND loop to stabilize. Thus, if the time interval during which the ND loop slews is illustrated by pulse 608 of FIG. 6f, time delay circuit 568 will produce an output pulse 610 on conductor H at a later time T4 as illustrated in FIG. 6h. Pulse 610 is coupled to the reset (R) inputs of peak detectors 562-566 for resetting the peak detectors to a low level, and is also coupled to the reset input of FF 552 for resetting the Q output low, thereby disabling gate 548 and opening the ND drive circuit. Pulse 610 is also applied by conductor H to the S input of FF 542 to set FF 542. The Q output of FF 542 then applies a high voltage to the reverse (REV) input of drive motor 306. Drive motor 306 begins to drive the imagers in the reverse (upward) direction. Tachometer 526 then begins to produce pulses and the PLL stabilizes with the motor driving upward at a constant speed. Start up sensor 538 is mechanically positioned so that sufficient time is allowed for the PLL to stabilize the motor speed in the upward direction before the sensor triggers. At a time such as T5, sensor 538 produces a pulse illustrated as 612 in FIG. 6j. Pulse 612 is applied over conductor J by way of OR 510 to the R input of FF 508 to guarantee the reset state. Pulse 612 is also applied from sensor 538 by way of OR 512 to the S input of FF 514, and directly over conductor J to the S input of FF 588. With FF 514 set by pulse 612, its Q output is high, AND 516 is enabled, and clock drive circuit 532 operates as described previously to cause imagers 570-574 to produce video-representative signals at their outputs.

Pulse 612 sets FF 588 at time T5, making its Q output high and the $\overline{Q}$ output low. The Q output of FF 588 is applied to analog gates 576-580 and to digital AND 589. With gates 576-580 enabled, the R, G and B-representative signals produced at the output of imagers 570-574 are clocked to the inputs of frame stores 582-586. One such signal produced on conductor N at the output of gate 580 is illustrated as 618 in FIG. 6n. In the same interval after time T5, clock pulses are coupled over conductor 238 through enabled AND 589 to frame stores 582-586 to allow the frame stores to digitize and store the image information in synchronism with the clocking of the imagers.

At the completion of 525 line scans as represented by 525 counts and the resulting full-count pulse by counter 530, FF 514 and 588 are reset at a time T6. With FF 514 reset, AND 516 is disabled thereby stopping the flow of pulses to CCD clock drive circuit 532. The resetting of FF 588 makes its Q output low, thereby disabling analog gates 576-580 and also opening AND 589 by which clock pulses were allowed to flow from drive circuit 532 to frame stores 582-586. Also, the resetting of FF 588 makes its $\overline{Q}$ high, thereby enabling AND 590 to allow application of NTSC clock pulses from a local source (not shown) to stores 582-586 by which readout of the stored image information from the frame stores to output terminals designated generally as 592 may be accomplished.

The motor continues to drive the imager assembly upward after time T6. At a later time T7, the imager assembly reaches a position at which it triggers an end up sensor 540. Sensor 540 produces at time T7 a motor stop signal illustrated as 616 of FIG. 6m. Pulse 616 is applied directly over conductor M to the R inputs of FF 542 and 560, and by way of OR 534 to the S input of FF 508. The resetting of FF 560 by pulse 616 enables AND 558 and disables analog gate 556. AND 558 applies to an input of differential amplifier 550 a reference voltage determined by network 559 which causes the closed ND drive loop to slew to a standard low-density condition. Resetting by pulse 616 of FF 542 conditions it for motor reversal during the next operating cycle. Setting of FF 508 guarantees reset of FF 502 in preparation for the next cycle and applies a further stop pulse to motor 306. This completes the operating cycle, which may be repeated with a new slide.

What is claimed is:

1. A method for generating a television video signal from a still image, comprising the steps of:
   mechanically scanning a line-scan imager across the image during a first scanning interval;
   generating uncorrected television signals having highlight levels established by the mechanical scan of said imager across said image during said first scanning interval;
   coupling said uncorrected television signals to highlight detection means for generating a highlight signal representative of the peak value attained by said uncorrected television signals during said mechanical scanning;
   applying said highlight signal to a light-changing means for stabilizing said peak value near a standard value; and
   mechanically scanning said line-scan imager across the image during a second scanning interval for generating corrected television signals in which said highlight signals are near said standard value.

* * * * *